United States Patent Office 2,897,767
Patented Aug. 4, 1959

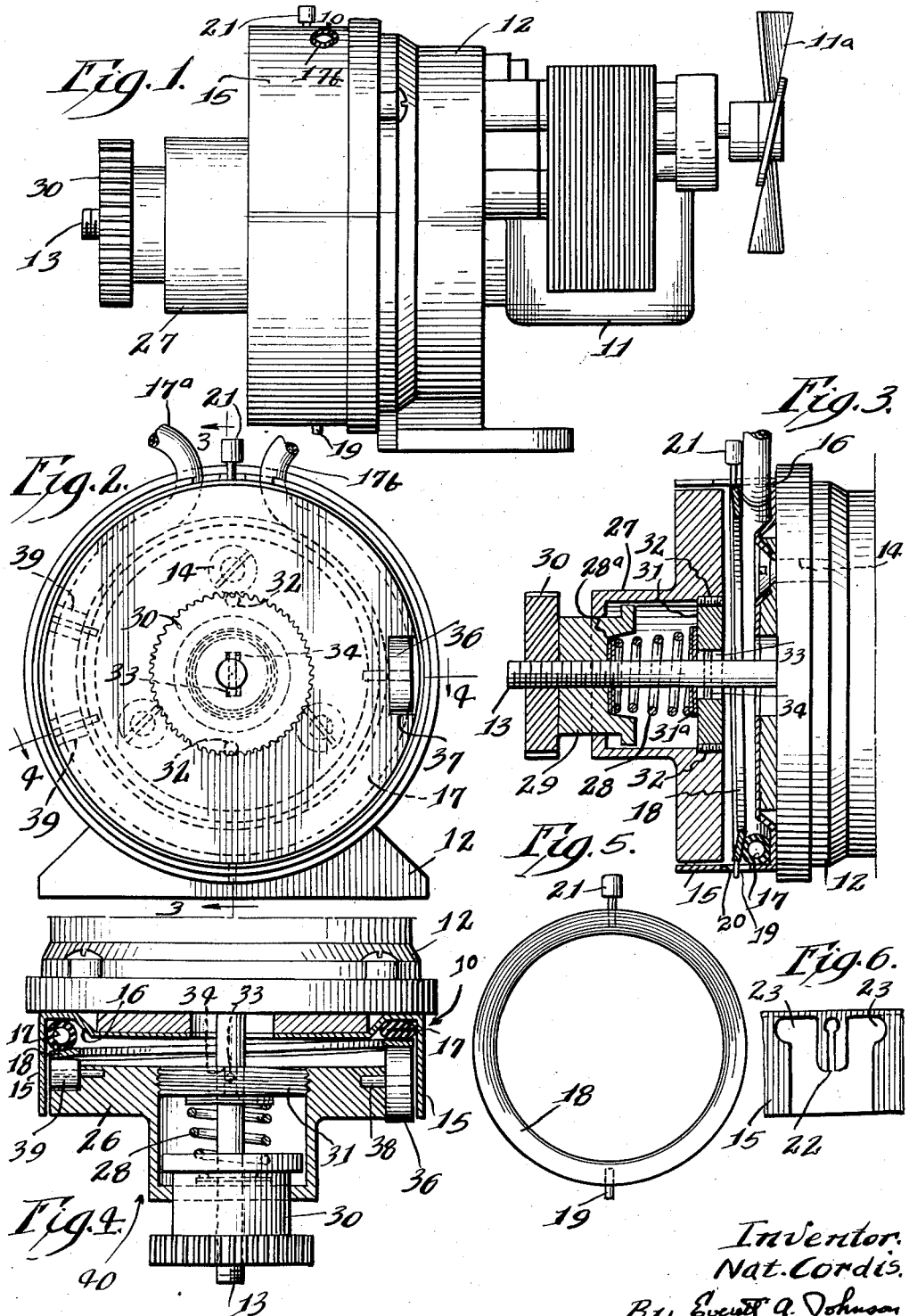

2,897,767

TUBE FLEXING PUMP

Nat Cordis, Silver Lake, Wis.

Application December 31, 1956, Serial No. 631,847

6 Claims. (Cl. 103—149)

This invention relates to a peristaltic pump and more particularly to a pump employing a flexible tube which is progressively compressed by a rotating member to force fluid ahead of the point of compression and to draw in fluid behind such point.

The transfer of fluids is a fundamental step in many fluid treating and chemical processes. In such processes it is recognized that the uniform transfer of very small flows of liquids becomes increasingly difficult and the need for positive means therefor, which is simple and easy to install, has become greater even though many different types of pumping equipment are available.

It has been found that pumping means based upon the manipulation of flexible tubing has the ability to handle a great many fluids and flexible tubing for such pumps made of plastics is available to convey almost all fluid substances. Such plastic tubing is an ideal material of construction for valveless pumping means. However, apparatus for manipulating such types of flexible tubing has not been of simple mechanical construction and it has been difficult heretofore to assemble the apparatus and to insert the tubing.

It is therefore a primary object of this invention to provide a tube flexing pump or meter of simple construction wherein relatively few moving parts are required. An additional object of the invention is to provide a simple and inexpensive pumping device which may be attached with ease to a continuous section of a flexible tube whereby said device will function cooperatively with the tube in a positive and an exceptionally effective manner for causing the flow of a fluid through said tube with a minimum effect on the flow due to any irregularities which might be present in the tube. A further object of my invention is to provide an apparatus in which the force applied to the walls of the tubing can be regulated so as to completely collapse the walls but not apply such force as might injure the tubing walls.

Still another object of my invention is to provide a simple and inexpensive apparatus which can be easily and quickly assembled and dismantled so that parts thereof may be interchanged and reassembled without destroying the accuracy of the pumping flow rate. A more specific object of the invention is to provide a tubing pump wherein the tubing is not caused to creep within the casing under the action of the rotated elements in compressing the walls of the tubing and expressing the contents thereof. It is yet another object of my invention to provide a flexible tubing pump assembly wherein no rotated element contacts the tubing directly. These and other objects of the invention will become apparent as my description thereof proceeds.

Briefly, according to my invention, I provide a housing having an annular channel in the base thereof within which the flexible tubing is positioned. A rotatable disc member carried by a motor driven shaft is provided with a peripherally mounted roller. Intermediate the roller and the tubing is a compression ring having means to prevent its rotation relative to the housing and the tubing within the channel. An electric motor fixed to the housing has a drive shaft on which the rotated pressure plate is rigidly fixed in a plane transverse to the axis of the drive shaft.

Further details of construction and advantages of my invention will be described by reference to a preferred embodiment thereof illustrated in the drawings wherein:

Figure 1 is an elevation showing the general assembly;

Figure 2 is a front view of the pump;

Figure 3 is a section taken along the line 3—3 in Figure 2;

Figure 4 is a section taken along the line 4—4 in Figure 2;

Figure 5 is a view showing the compression ring; and

Figure 6 is a fragmentary view of the pump housing.

Referring to the drawing, the pump or meter unit comprises the housing 10, constant speed motor 11, the mounting block 12 for the housing 10 and the motor 11, and a motor shaft 13 extending through the housing 10. The housing 10 is fixed by screws 14 to the block 12 and has a flange or wall 15 and a groove or trough 16 in its base which accommodates the tubing 17.

The contact or compression ring 18 overlies the tubing 17 when in the trough 16. The ring 18 has a pin 19 which is secured within the slot 20 in the wall 15 and a headed pin 21 which snaps into the slot 22 in the wall 15. On each side of the snap slot 22 are key-slotted grooves 23 adapted to receive the ends 17a and 17b of the tubing 17.

The pump rotor assembly comprises disc 26 having a central hollow boss 27 which encloses tapered coil spring 28. This spring engages the thrust washer 28a in spring seat 29 in the pump adjustment knob or nut 30 which is threaded to the motor shaft 13. The inner end of the spring 28 contacts the thrust washers 31a on thrust plate 31 keyed to the disc 26 by key pins 32, the thrust plate 31 being provided with a transverse key slot 33 which accommodates the shaft 13 and engages the shaft pin 34.

The pump rotor or disc 26 carries a contact roller 36 set into the notch 37 at the periphery of the disc 26 on a radially extending shaft or pin 38. This roller 36 is of substantial diameter and is set to contact the ring 18 and depress it into the trough 16 and thereby collapse the tubing 17 as the disc 26 and roller 36 are rotated within the housing 10 by the constant speed motor 11. This is shown in Figure 4.

Opposite the roller 36 are a pair of roller pins 39 set flush in the disc 26 and also contacting the ring 18 but not depressing the ring 18. The function of the roller pins 39 is to reduce any tendency of the disc 26 to cause the ring 18 to rotate with it which may be the case when the edge of the disc 26 is held against the ring 18 and rotated as described.

The ring 18 is also provided with pin 19 and headed pin 21. When assembling the pump and after the tubing 17 has been placed in the trough 16, the pin 19 is inserted into the slot 20 and the ring 18 with its headed pin 21 is pushed into the housing 10 and the pin 21 snapped into the slot 22. At this point the ends 17a and 17b of the tubing 17 extend from the housing 10 and from under the ring 18 through the key-slotted grooves 23 at either side of the pin-retaining slot 22. If desired a short length of a rigid tube can be inserted into the end 17a to act as a stop or anchor for the tubing 17.

The pump rotor assembly 40 comprising the disc 26, the knob 30, the spring 28, and the contact roller 36, together with the thrust plate 31 and the roller pins 39 is then arranged in place over the ring 18 and the knob turned to give the desired spring tension or pressure on the tubing 17.

By adjusting the threaded knob 30 the force of the spring 28 against the thrust plate 31 and hence the force of the disc 26 inwardly of the contact ring 18 and of tubing 17 can be varied. This tension should be sufficient to completely collapse the tubing as shown in Figure 4.

The inlet end 17a of the tubing 17 is inserted into a reservoir (not shown) for the liquid to be pumped and the discharge end 17b is connected to the transfer line such as a stream of flowing liquid to be treated with the pumped and metered fluid. As the disc 26 is rotated 360 degrees by the motor 11 through the shaft 13 the roller 36 deflects the floating ring 18 into the channel 16 to progressively and successively collapse a section of the tubing 17. This moves fluids through the tubing 17 ahead of the roller 36 and out of the end 17b while drawing in fluid through end 17a.

To replace the tubing 17, the rotating pressure plate 26 is removed by withdrawing the adjustment knob 30 from the threaded shaft 13. The plate 26 and the compression ring 18 are then removed and the tubing 17 can be lifted from the housing 10.

A section of tubing 17, formed in a loop, is placed within the channel 16 with the ends 17a and 17b extending through the slots 23 in the ported wall 15 of the housing 10. The compression ring 18 is then replaced with the small pin 19 extending through the slot 20 in the lower side of the wall 15 (note Figures 3 and 5). The large headed pin 21 is placed upright within slot 22 between the exposed ends 17a and 17b of the tubing.

It will be noted that the compression ring 18 is of such dimensions as to enter the channel 16 in compressing the tubing 17. The pressure plate 26 is screwed on by turning the nut 30 onto the shaft 13 as firmly as is possible with the fingers. To determine whether the rotatable pressure plate 26 is tight enough to cause the peripherally mounted roller 36 to deflect the compression ring 18 and collapse the tubing 17, suction is applied to end 17b of the tube 17. If the tubing collapses under such suction the pressure plate 26 is properly adjusted and will function as described.

The assembly described may be used as a meter as well as a pump. Thus when the fluid is applied to the inlet end 17a of the tubing 17, the motor speed can be adjusted to gate the desired flow of fluids without necessarily contributing any pressure head to the flowing stream.

Although I have described my invention with reference to a preferred embodiment thereof it should be understood that this is by way of illustration only and that further modifications in the apparatus are contemplated, in view of my teaching to the art, without departing from the spirit and scope of the described invention.

What I claim is:

1. An apparatus comprising a body having a substantially cylindrical cup, an annular groove in the base of said cup adapted to accommodate a loop of flexible tubing, a drive shaft extending axially through said cup, a pressure plate carried by the said shaft and comprising a removable cover for the said cup, a roller carried by the periphery of said pressure plate, said roller projecting beyond the planar surface of said pressure plate, a compression ring interposed said groove and said pressure plate, said roller contacting one surface of said compression ring, means removably carried by said shaft maintaining said pressure plate in a plane perpendicular to the said shaft and for axially adjusting the position thereof with respect to the base of said cup, and motor means driving the said shaft to revolve the said pressure plate and hence said roller.

2. The apparatus of claim 1 wherein said compression ring is provided with means engaging the wall of said cup to prevent rotation of said ring.

3. The apparatus of claim 1 wherein said pressure plate includes a central hollow boss, an internal flange at one end of said boss, a thrust plate closing the other end of said boss, means in said plate engaging said shaft, an internally threaded nut slidably cooperating with said flange within said hollow boss, and a coil spring extending between said thrust plate and said threaded nut, said spring exerting an axial thrust inwardly of said nut against said thrust plate.

4. A tubing pump comprising in combination a base provided with an annular peripheral groove, an upstanding flange bordering said groove, a loop of flexible tubing within said groove, a slot in said flange through which the ends of said tubing pass, a compression ring aligned with said groove, a drive shaft extending through said base coaxially with said groove, a pressure plate fixed to said drive shaft and overlying said compression ring, peripheral roller means carried by said pressure plate and having a portion thereof interposed the outer surface of said compression ring and said pressure plate, and adjustable means for resiliently mounting said pressure plate axially about said drive shaft whereby rotation of said drive shaft rotates said roller means and progressively collapses the tubing through the action of the deflected compression ring.

5. A pumping apparatus for use with flexible tubing to move fluids therethrough by successively and progressively compressing said tubing in a direction longitudinally of a section thereof comprising a housing having a circumferential groove in the base thereof, a port in said housing communicating with said groove, a looped section of flexible tubing positioned within the groove with opposed ends thereof extending outwardly of the housing through said port, a rigid pressure plate mounted for rotation with respect to the said groove concentric with the axis about which the groove is defined and in a plane parallel to said base, a floating compression ring overlying said groove and of a width adapted to enter the groove and engage the looped section of said flexible tubing when positioned therein, and roller means carried by said rotated pressure plate and progressively contacting sections of the compression ring, said roller successively and progressively deflecting said ring into said groove so as to successively and progressively collapse a portion of said flexible tubing when the pressure plate is rotated, the compressing force of the ring on the tubing being substantially parallel and offset radially with respect to the axis of the drive shaft whereby a smooth pumping action is obtained.

6. A pump comprising an open elastic tubing loop of generally circular form but of less than 360 degrees, said loop having adjacent inlet and outlet portions, a casing for said loop, said casing having a base portion and a wall portion, a port in said wall portion through which said inlet and outlet portions project radially, a rigid circular pressure plate rotatable within said casing, a nutating floating ring disposed between said loop and said plate, means preventing rotation of said ring, at least two roller means at peripherally spaced points on said plate and contacting said ring, said rollers being of substantially different diameter, one of said rollers being adapted to urge said ring toward said casing and progressively compress said tube upon rotation of said plate and another of said rollers being adapted to retain the ring in contact with the expanding portion of the tube whereby said rollers act on said ring to compress said tube progressively and continuously while maintaining said tube in contact with ring throughout the length of the loop in said casing.

References Cited in the file of this patent
UNITED STATES PATENTS

| | | |
|---|---|---|
| 2,534,855 | Corneil | Dec. 19, 1950 |
| 2,671,412 | Rand | Mar. 9, 1954 |
| 2,752,852 | Offutt | July 3, 1956 |